US006303211B1

(12) United States Patent
MacKinlay et al.

(10) Patent No.: US 6,303,211 B1
(45) Date of Patent: Oct. 16, 2001

(54) TAMPER-EVIDENT ELECTRIC PAPER

(75) Inventors: Jock D. MacKinlay; Daniel G. Bobrow, both of Palo Alto; Daniel H. Greene, Sunnyvale; L. Charles Hebel, Cupertino; Nicholas K. Sheridon, Los Altos, all of CA (US); Craig A. Smith, Pittsford; William C. Emerson, Rochester, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/239,293

(22) Filed: Jan. 29, 1999

(51) Int. Cl.[7] ............................ B32B 27/14; B32B 3/00

(52) U.S. Cl. ............................ 428/195; 428/212; 283/72

(58) Field of Search .................................. 428/195, 212; 283/72

(56) References Cited

U.S. PATENT DOCUMENTS

| | | | |
|---|---|---|---|
| 4,126,854 | 11/1978 | Sheridon . | |
| 4,143,103 | 3/1979 | Sheridon . | |
| 5,389,945 | 2/1995 | Sheridon . | |
| 5,481,377 | 1/1996 | Udagawa et al. . | |
| 5,481,378 | 1/1996 | Sugano et al. . | |
| 5,604,027 | 2/1997 | Sheridon . | |
| 5,723,204 | 3/1998 | Stefik . | |
| 5,767,826 * | 6/1998 | Sheridon et al. | 345/84 |
| 5,825,529 * | 10/1998 | Crowley | 359/296 |

FOREIGN PATENT DOCUMENTS

| | | |
|---|---|---|
| WO 97/33267 | 9/1997 | (WO) . |
| WO 99/39233 | 8/1999 | (WO) . |

* cited by examiner

*Primary Examiner*—Bruce H. Hess
*Assistant Examiner*—B. Shewareged
(74) *Attorney, Agent, or Firm*—Oliff & Berridge, PLC

(57) ABSTRACT

Tamper-evident electric paper is made of two sheets of electric paper bonded together, the bottom sheet of which includes a pattern. Any attempt to erase a writing on the top sheet of electric paper results in the pattern on the bottom sheet of electric paper being erased. Therefore any tampering by erasure of a writing on the tamper-evident electric paper is revealed by the absence of a portion of the pattern on the bottom sheet of electric paper. Single sheet tamper-evident electric paper has a complex pattern, such as an encryption, printed on a single sheet of electric paper. Any attempt to erase a writing on the electric paper also erases a portion of the encryption, thereby providing evidence of tampering.

16 Claims, 7 Drawing Sheets

TAMPER-EVIDENT ELECTRIC PAPER

BACKGROUND OF THE INVENTION

1. Field of Invention

This invention relates to reusable electric paper and, more specifically, reusable electric paper that discourages tampering by providing evidence of tampering.

2. Description of Related Art

FIG. 1 shows one form of electric paper 1 which consists of a polymer substrate with little balls 20 embedded that are one color, for example, white 30, on one side and another color, for example, black 40, on the other. Such electric paper is described in U.S. Pat. No. 5,604,027, incorporated herein by reference. Under the influence of an electric field, each ball rotates so that either one colored side or the other is on top and, therefore, visible to a viewer viewing the electric paper from the top.

Printing on electric paper is accomplished by imposing an electrical pattern over the sheet, the electrical pattern being created by a voltage difference between the top side of the sheet and the bottom side of the sheet. A typical way to do this is to pass the sheet under a charging bar. As the sheet passes under the bar, voltages are applied along a set of closely-spaced electrical contacts, one for each pixel or ball.

While one form of electric paper is described above, many forms of electric paper are known such as electric paper including other types of rotating elements, like cylinders, or electrophoretic or liquid crystal forms of electric paper.

Audit trail documents are found throughout our society. For example, most items shipped from a factory to a customer typically include a document on the outside of the packaging to collect the signatures from the various people who handle the items. These documents often have multiple sheets of regular paper with carbon paper separators so that each person can retain a record of their signature and the transaction history up to that point. In today's world, computers are becoming more and more involved in transactions involving audit trails. For example, many shippers are now using computers to streamline their operations, including reducing the paperwork associated with their internal audit trails. A problem associated with such use of computers is that audit trail transactions often occur between people from different organizations. Although both organizations involved need a record of the transaction, one or the other organization may not be computerized or, even if both organizations are computerized, their computers may not be compatible with each other. Such incompatibility or lack of computerization results in transaction history becoming scattered among computer and paper records rather than being recorded on a single audit trail document.

SUMMARY OF THE INVENTION

These problems are addressed by the invention by providing a tamper-evident electric paper. One example of tamper-evident electric paper of the invention is made of two sheets of electric paper glued together after the top sheet has been erased to white and the bottom sheet has been printed with a uniform pattern. The pattern of the bottom sheet could be, for example, a grid of alternating black and white pixels. Writing on the tamper-evident electric paper would cause the addressed pixels to turn to, for example, black on both the top and bottom sheets. Erasing (e.g., restoring the pixels to white) a portion of the tamper-evident electric paper would not only restore the erased portion of the top sheet to white, but would also change the corresponding portion of the bottom sheet to white, thereby erasing not only the written image on the bottom sheet but also the uniform pattern on the bottom sheet. As a result, any erasing performed on the tamper-evident electric paper is evidenced by destruction of the uniform pattern on the bottom sheet. If the tamper-evident electric paper was subjected to the appropriate electric field required to restore the uniform pattern to the bottom sheet in order to try to hide the erasing, the uniform pattern would also be visible on the top sheet.

In one aspect of the invention, a permanent glue is used to bond the top sheet to the bottom sheet, making the resulting tamper-evident electric paper virtually impossible to erase without detection. However, the tamper-evident electric paper can be used only once as tamper-evident electric paper unless the two sheets could be separated. It could, however, always be reused as regular electric paper.

The tamper-evident electric paper can be used for audit trails that may or may not involve computers. The paper can be signed by a pen that creates an electrical field between its tip and a uniform electrode on the other side of the electric paper sheet. When computers are involved in the audit trail, a jack-in-the-box display can be used by inserting the audit trail tamper-evident electric paper into the display. Signatures and other entries are captured simultaneously into a computer attached to the jack-in-the-box display and onto the electric paper. Additionally, a scanning version of the display could allow the audit trail document to be stored into the computer and/or copied onto another sheet of electric paper to generate a record of the transaction that can be retained while the audit trail document continues to follow its trail.

The invention also provides a reusable tamper-evident electric paper that uses, for example, balls that require different electrical field strengths for rotation. The rotation of these balls follows a threshold-like behavior. Fields below a given value do not cause ball rotation, whereas fields above this value do. It is known that smaller balls commence rotation at lower electrical field strengths than do larger balls. Hence, the tamper-evident layer is made out of smaller balls that can be written at a lower field strength than the other layer. To reuse the tamper-evident electric paper, a new tamper-evident pattern is printed by using the higher voltage to erase everything and then using the lower voltage to print the tamper-evident pattern on the tamper-evident layer without changing the white of the other layer. While undetected tampering is possible with this type of tamper-evident electric paper, it would require a printer that generates both the higher voltage and the lower voltage.

The invention also provides a single sheet embodiment that has a background pattern printed on the sheet prior to use. The background pattern is a complex pattern such as, for example, encryption.

BRIEF DESCRIPTION OF THE DRAWINGS

The invention will be described in relation to the following drawings in which like reference numerals refer to like elements, and wherein.

DETAILED DESCRIPTION OF PREFERRED EMBODIMENTS

Figure 1:
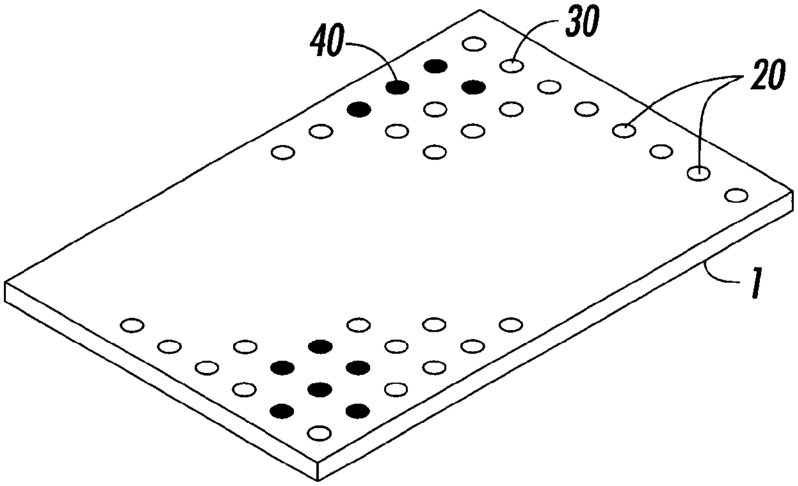
FIG. 1 (RELATED ART)
FIG. 1 shows a conventional piece of electric paper.
Figure 2:
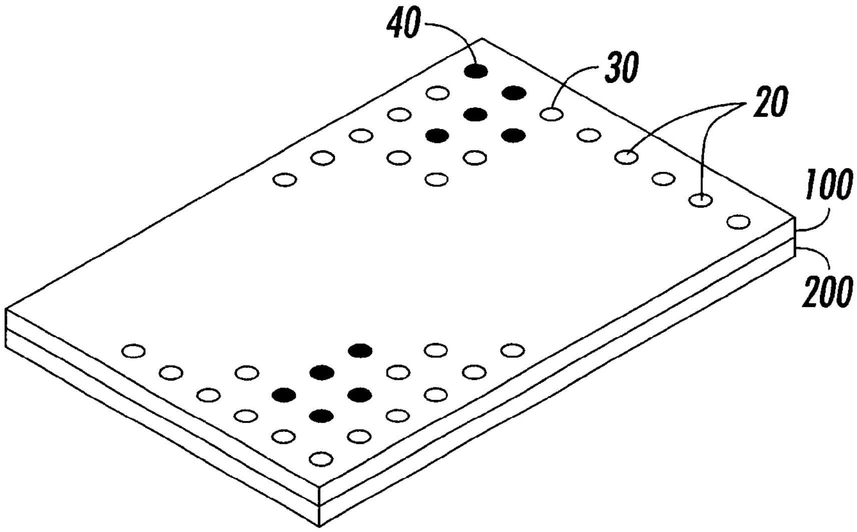
FIG. 2 shows one embodiment of tamper-evident electric paper of the present invention.

FIG. 2 shows one embodiment of tamper-evident electric paper of the present invention. The tamper-evident electric paper of FIG. 2 is made of two sheets of electric paper, top sheet 100 and bottom sheet 200. Top sheet 100 and bottom sheet 200 can be, for example, sheets of conventional electric paper as shown in FIG. 1. In this example, both top sheet 100 and bottom sheet 200 consist of a polymer substrate with elements 20 embedded that are white on one side and black on the other, although other combinations, including color, are possible. Reference numeral 30 indicates an element 20 with its white side up and reference numeral 40 indicates an element 20 with its black side up. Although only certain elements 20 are shown in FIG. 2, it is to be understood that substantially all of the area of top sheet 100 and bottom sheet 200 contain elements 20. In addition, while the drawings show the elements 20 spaced apart for clarity, it is to be understood that the elements 20 are actually spaced very close together.

Figure 3:
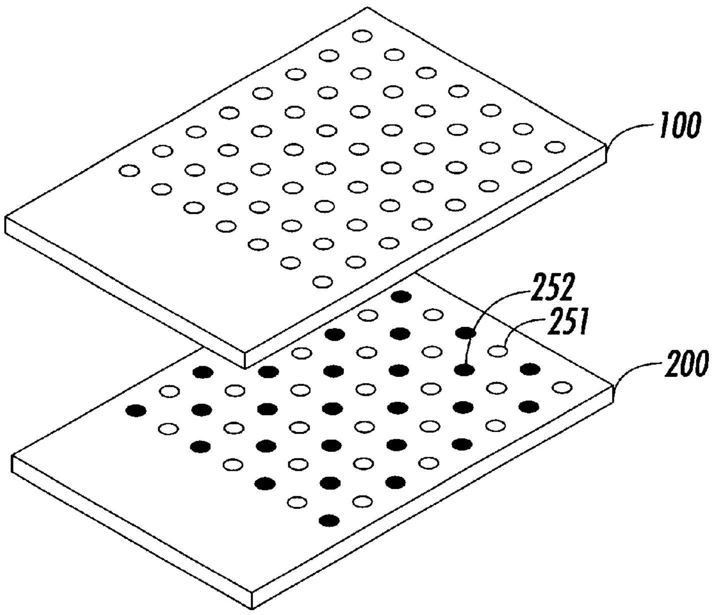
FIG. 3 is an exploded view of the tamper-evident electric paper of FIG. 2 before being used.

FIG. 3 shows top sheet 100 and bottom sheet 200 immediately prior to bonding of the two sheets. In this example, top sheet 100 and bottom sheet 200 are permanently glued together. However, the top and bottom sheets 100 and 200 could be less permanently adhered together or mechanically fastened by staples or rivets. Prior to gluing, top sheet 100 is "erased to white", which means that top sheet 100 is exposed to an electric field which causes all of the elements 20 to rotate such that their white side 30 is up. Also prior to gluing, bottom sheet 200 is subjected to an electric field such that a pattern is created by rotating some elements so that their white side 30 is up and other elements so that their black side 40 is up. In the example shown in FIG. 3, the elements 20 are subjected to an electric field that creates a gray pattern in which alternating elements 20 are black side up and white side up. Although a simple gray pattern is used in this example to illustrate how the invention works, any pattern, such as glyphs or other encryption codes may be used. For example, a white side 30 of an element 20 could represent a "0" and a black side 40 could represent at "1". Thus, a digital encryption code, or signature, could be printed on the bottom sheet 200, if desired.

Figure 4:
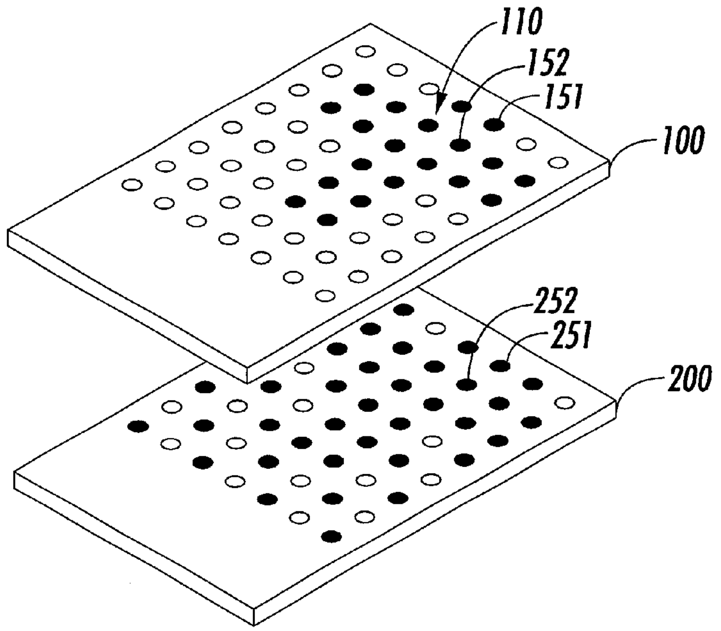
FIG. 4 is an exploded view of the tamper-evident electric paper of FIG. 3 after writing.
Figure 5:
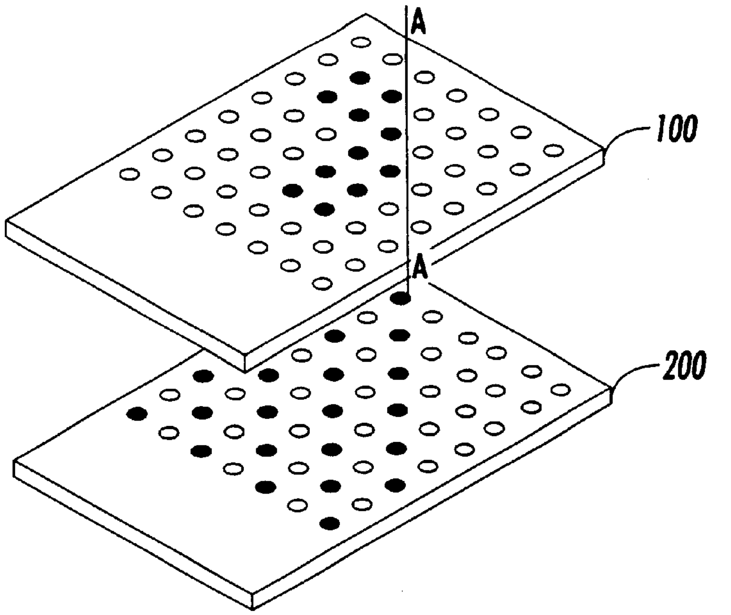
FIG. 5 is an exploded view of the tamper-evident electric paper of FIG. 4 after a portion of the writing has been erased.
Figure 6:
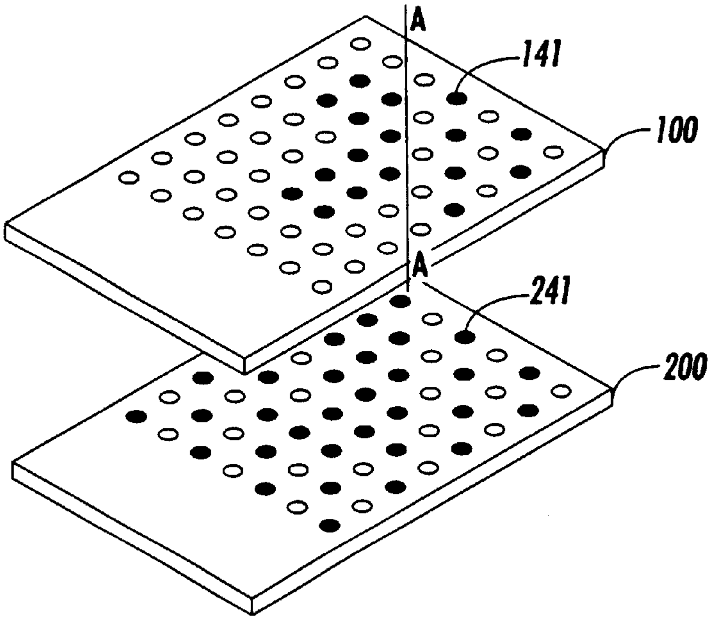
FIG. 6 is an exploded view of the tamper-evident electric paper of FIG. 5 after an attempt to restore the pattern of the lower sheet.

FIGS. 4–6 are exploded views of the tamper-evident electric paper shown in FIGS. 2 and 3. Although FIGS. 4–6 illustrate different states of top sheet 100 and bottom sheet 200 after top sheet 100 and bottom sheet 200 are permanently glued together, FIGS. 4–6 are shown in exploded view for clarity.

FIG. 4 shows top sheet 100 and bottom sheet 200 after the tamper-evident electric paper has been written on by a user. The writing 110, in this example in the shape of a cross, is visible on top sheet 100 because the elements 20 subjected to the electric field created by the writing instrument turn so that their black side 40 is up. However, the electric field which causes the elements 20 of top sheet 100 to rotate also causes corresponding elements 20 of bottom sheet 200 to similarly rotate so that their black side 40 is up. For illustration purposes, elements will be referred to by three digit reference numerals wherein the first digit corresponds to the sheet (1 for top sheet 100, 2 for bottom sheet 200), the second digit corresponds to the column (from the left side of the paper) of an element and the third digit corresponds to the row (from the top of the paper) of an element. For example, element 151 shown in FIG. 4 is on the top sheet 100 in column 5, row 1 and element 252 is on bottom sheet 200 in column 5, row 2.

In FIG. 3, before the tamper-evident electric paper is subjected to the writing 110, element 251 has its white side 30 up. As shown in FIG. 4, after writing, element 251 has its black side 40 up because the electric field which caused element 151 to turn black side 40 up during writing also caused element 251 to turn black side 40 up. Element 252, as shown in FIG. 3, has its black side 40 up as part of the pattern imposed on bottom sheet 200 prior to assembly of the tamper-evident electric paper. At the time of writing, element 152 is turned black side 40 up as shown in FIG. 4. Because element 252 was already black side 40 up prior to writing, element 252 remains black side 40 up after writing. In other words, the elements 20 of bottom sheet 200 which correspond to the elements 20 of top sheet 100 effected by writing will be black side 40 up after writing regardless of whether they were black side 40 up prior to writing. As shown in FIG. 4, after writing, bottom sheet 200 includes the image of the writing 110 superimposed on the pattern shown in FIG. 3.

FIG. 5 is an exploded view of the tamper-evident electric paper of FIG. 4 after a portion of the writing 110 has been erased. The area to the right of line A—A in FIG. 5 has been erased by subjecting the tamper-evident electric paper to an electric field which causes the elements 20 to rotate such that their white side 30 is up. As shown in FIG. 5, the elements 20 of bottom sheet 200 to the right of line A—A are rotated white side 30 up as well as the corresponding elements 20 in top sheet 100.

FIG. 6 is an exploded view of the tamper-evident electric paper of FIG. 5 after an attempt to restore the pattern of the bottom sheet 200. Such restoration could be attempted in an effort to conceal the fact the tamper-evident electric paper has been tampered with. In this example, the tampering is the partial erasure of the writing 110. As shown in FIG. 6, the attempt to restore the pattern to bottom sheet 200 is successful but, results in the pattern also being shown on top sheet 100. This is because subjecting the tamper-evident electric paper to the electric field required to restore the pattern to bottom sheet 200 also subjects the elements 20 of top sheet 100 to the same electric field. For example, note that element 141 is turned black side 40 up when corresponding element 241 is restored as part of the pattern of bottom sheet 200.

The above description illustrates how two sheets of electric paper permanently bonded together result in tamper-evident electric paper that is almost impossible to tamper with without detection.

While the above example has been described using two sheets of electric paper permanently bonded together, the two sheets of electric paper can also be removably bonded together by using, for example, a dissolvable glue or other reversible bonding. By using non-permanent bonding, the security level of the tamper resistance is lowered, but the resulting tamper-evident electric paper is reusable as tamper-evident electric paper. The security level of the tamper-evident electric paper using reversible or non-permanent bonding of the two sheets can be increased by limiting access to the reversing agent of the bonding material. For example, access to glue solvent could be limited. While glue has been used as an example of a bonding agent for both permanent bonding and non-permanent bonding, any other appropriate bonding agent could be used. For example, clips, clasps or electronic locks could be used to bond the top sheet and the bottom sheet together.

Figure 12:
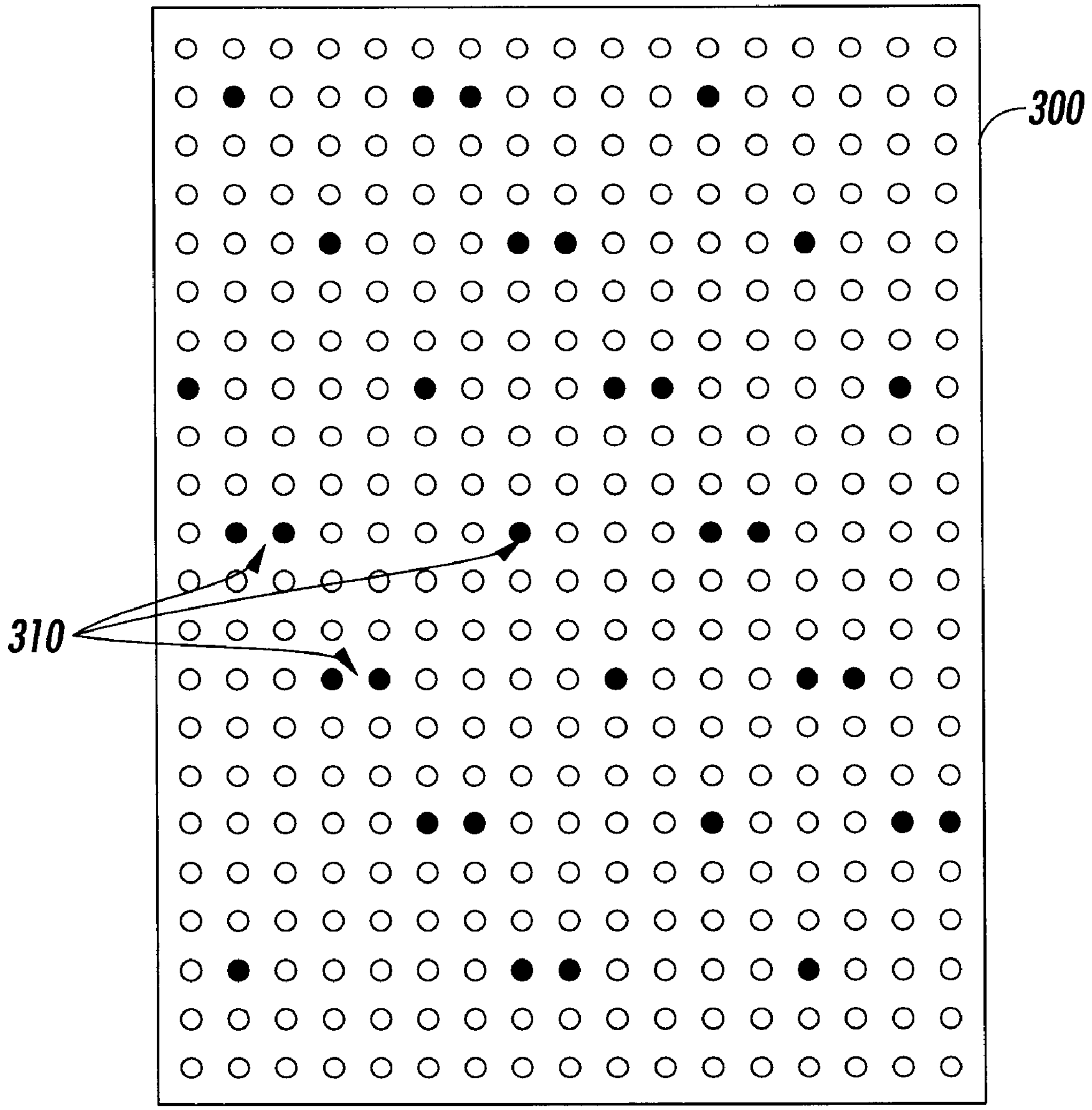
FIG. 12 shows another embodiment of the invention having a single sheet of electric paper.

In another embodiment of the invention, shown in FIG. 12, the same idea described in relation to FIGS. 2–6 is applied to a tamper-evident electric paper using only a single sheet of electric paper. The same concept described above in relation to FIGS. 2–6 is applied to a single sheet 300 by imposing a complex pattern 310 on the single sheet 300 prior to writing. The complex pattern 310 could be an encryption so that any attempt to restore the complex pattern 310 would require the possession of the encryption key. As a result, erasure by someone who is not in possession of the encryption key would result in not only the writing being erased, but also the complex pattern being erased, thereby leaving evidence of tampering. For low security applications, the pattern could be a complex watermark or other complex pattern.

Figure 7:
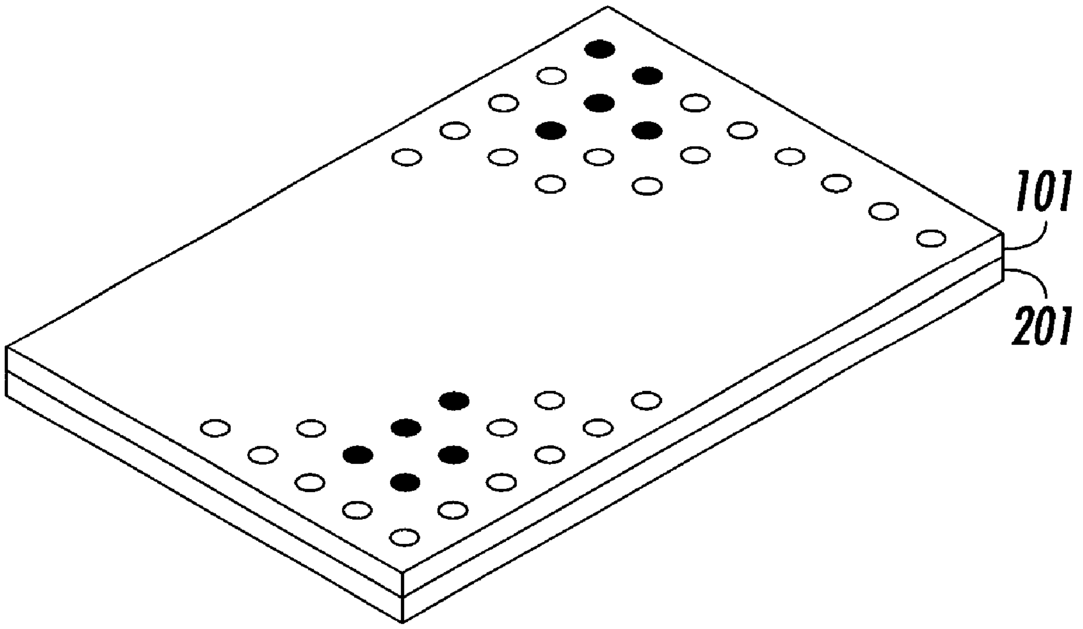
FIG. 7 shows another embodiment of the tamper-evident electric paper of the present invention.

FIGS. 7–11 show another embodiment of the tamper-evident electric paper of the present invention. FIG. 7 shows tamper-evident electric paper made of two sheets of electric paper, top sheet 101 and bottom sheet 201. The elements 20 of top sheet 101 require a different electric field strength for orientation than the elements 20 of bottom sheet 201. In particular, the elements 20 of bottom sheet 201 rotate when subjected to an electric field having a lower strength than the electric field required to rotate the elements 20 of top sheet 101. In this example, the elements 20 of top sheet 101 are created using a different diameter ball than the elements 20 of bottom sheet 201. Because the elements 20 of bottom sheet 201 respond to an electric field having lower strength than that required to rotate the elements 20 of top sheet 101, this embodiment of the invention is a tamper-evident electric paper which is reusable as tamper-evident electric paper even though top sheet 101 and bottom sheet 201 are permanently bonded together prior to any orienting of the elements 20 of either layer. FIGS. 8–11 are shown in exploded view for illustration purposes only and it should be noted that the states of the tamper-evident electric paper shown in FIGS. 8–11 exist while top sheet 101 and bottom sheet 201 are permanently bonded together.

Figure 8:
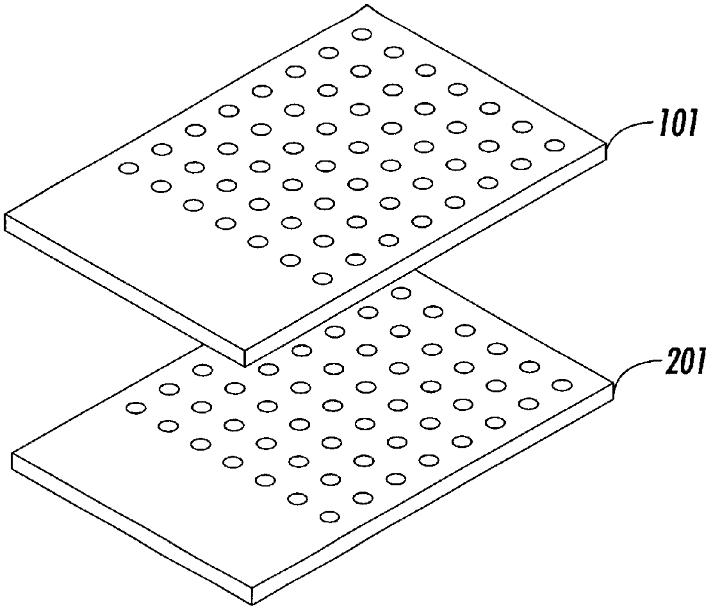
FIG. 8 is an exploded view of the tamper-evident electric paper of FIG. 7 with both the top and bottom layers white.

FIG. 8 shows both top sheet 101 and bottom sheet 201 erased to white.

Figure 9:
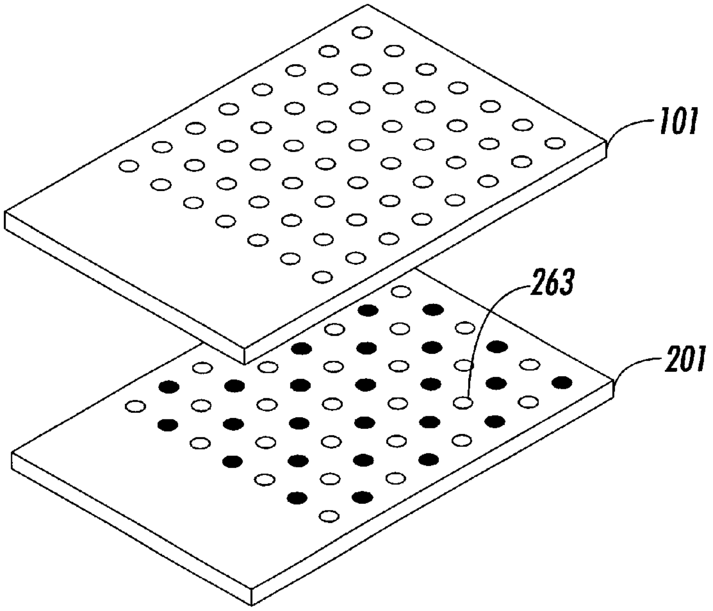
FIG. 9 is an exploded view of the tamper-evident electric paper of FIG. 8 after the pattern has been printed on the bottom layer.

FIG. 9 shows the tamper-evident electric paper of this embodiment after a pattern has been imposed on bottom sheet 201. Because the elements 20 of bottom sheet 201 rotate when subjected to an electric field that is weaker than the electric field required to rotate the elements 20 of top sheet 101, the tamper-evident electric paper can be subjected to an electric field having a strength between that required to rotate the balls of bottom sheet 201 and that required to rotate the balls of top sheet 101 in order to create the pattern on only bottom sheet 201. This can be done while the top sheet 101 and the bottom sheet 201 are permanently bonded together because the electric field is too weak to rotate the elements 20 of top sheet 101. As in the first embodiment, a gray pattern is used as an example, but it is understood that any pattern could be used.

Figure 10:
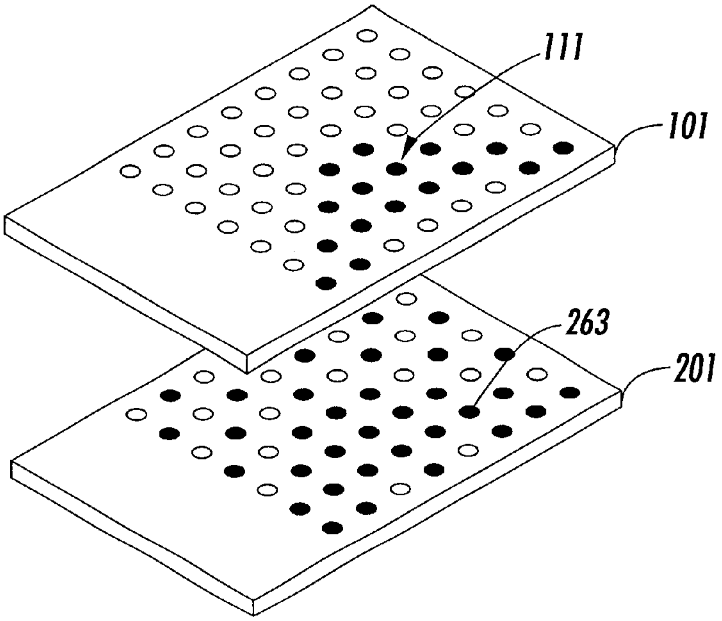
FIG. 10 is an exploded view of the tamper-evident electric paper of FIG. 9 after writing.

FIG. 10 shows the tamper-evident electric paper of FIG. 9 after a writing 111 has been imposed on top sheet 101. Because the electric field required to rotate the elements 20 of top sheet 101 is stronger than the electric field required to rotate the elements 20 of bottom sheet 201, the elements 20 of bottom sheet 201 that correspond to the elements 20 of top sheet 101 rotated as a result of the writing 111 are also rotated. For example, as shown in FIG. 9, element 263 has its white side 30 up as part of the pattern imposed on bottom sheet 201, but, as shown in FIG. 10, has its black side 40 up as a result of writing 111. Therefore, after writing, bottom sheet 201 shows the writing 111 superimposed on the pattern shown in FIG. 9.

Figure 11:
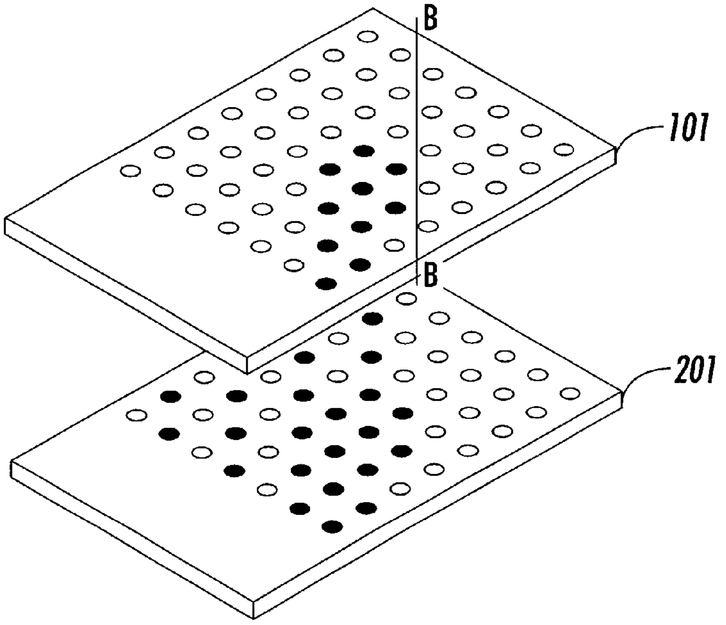
FIG. 11 is an exploded view of the tamper-evident electric paper of FIG. 10 after partial erasing.

FIG. 11 shows the tamper-evident electric paper of FIG. 10 after the area to the right of line B—B has been erased to white. As shown in FIG. 11, because the electric field required to rotate the elements 20 of top sheet 101 is stronger than the electric field required to rotate the elements 20 of bottom sheet 201, the elements 20 of bottom sheet 201 in the area corresponding to the area of top sheet 101 to the right of line B—B are also erased to white. As a result, any attempt to erase a portion of a writing on top sheet 101 creates evidence of such erasing.

In order to reuse the tamper-evident electric paper of this embodiment, the tamper-evident electric paper is subjected to an electric field that erases to white the entire top sheet 101. Because this electric field would also be strong enough to erase to white the bottom sheet 201, both top sheet 101 and bottom sheet 201 are restored to the condition shown in FIG. 8. At this point, the tamper-evident electric paper is ready to be used again. While it is recognized that tamper-evident electric paper of this embodiment may be less secure than the tamper-evident electric paper shown in FIG. 2–6, this embodiment results in a reusable tamper-evident electric paper. Also to reconstruct a particular writing after tampering would require devices generating electric fields having the two different strengths.

While many uses of tamper-evident electric paper of the present invention will become obvious from this application, some examples of such uses are attaching a piece of the tamper-evident electric paper to a library book in order to record pertinent lending information, identification or information displays regarding configuration, inventory numbers, etc. on computers or office equipment, price tags attached to merchandise, service and user labels which are attached to products and which must be translated, and mailing labels which are attached at the time of manufacture and imaged from computer lists just before shipment. This list includes only a very few examples of the large number of applications available for tamper-evident electric paper of the present invention and should not be considered as limiting.

In both the single sheet embodiments and the two sheet embodiments, it is possible to determine the image shown on the top side of the bottom sheet by viewing the bottom side of the bottom sheet. In some applications, it would be considered advantageous to be able to view the bottom side of the bottom sheet so that a potential forger would be aware of the tamper-evident nature of the electric paper, thereby possibly deterring forgery. In addition, having the bottom side of the bottom sheet exposed might allow one to determine if the electric paper has been tampered with. On the other hand, in other applications it may be advantageous to provide a cover so that the bottom side of the bottom sheet is not visible. Such applications include those in which catching a forger is preferred to deterring forgery. Other examples of applications in which it would be advantageous to provide, or not provide, a cover over the bottom side of the bottom sheet will become apparent from this application.

The invention could also be provided with a layer of ordinary paper bonded on top of the electric paper so that ordinary writing and electric writing can both be used. Also, several sheets of tamper-evident electric paper can be removably stuck together so that a signature written on the top sheet appears on all sheets below the top sheet, thereby providing a removable copy of all the signatures prior to and including the most recent signature.

While the invention has been described using an example of electric paper having rotating elements, it should be noted that the invention also applies to other types of electric paper such as, for example, electrophoretic electric paper and liquid crystal electric paper.

While the invention has been described in conjunction with the specific embodiments described above, it is evident that many alternatives, modifications and variations will be apparent to those skilled in the art. Accordingly, the preferred embodiments of the invention as set forth above are intended to be illustrative and not limiting. Various changes may be made without departing from the spirit and scope of the invention as defined herein.

What is claimed is:

1. Tamper-evident electric paper, comprising:

a first sheet of electric paper having pixels that form a first pattern;

a second sheet of electric paper having pixels that form a second predetermined pattern different from the first pattern, the second sheet being attached to the first sheet, wherein a security pattern is defined by the second predetermined pattern.

2. The tamper-evident electric paper of claim 1, wherein the pixels of the second sheet are oriented by substantially any first electric field that orients the pixels of the first sheet.

3. The tamper-evident electric paper of claim 2, wherein the pixels of the first sheet are oriented by substantially any first electric field that orients the pixels of the second sheet.

4. The tamper-evident electric paper of claim 2, wherein the pixels of the second sheet are oriented by a second electric field weaker than the first electric field.

5. The tamper-evident electric paper of claim 4, wherein the second pattern comprises a glyph.

6. The tamper-evident electric paper of claim 4, wherein the second pattern is an encryption.

7. The tamper-evident electric paper of claim 4, wherein the first sheet and the second sheet are permanently bonded together.

8. The tamper-evident electric paper of claim 7, wherein the first sheet and the second sheet are permanently bonded together with a glue.

9. The tamper-evident electric paper of claim 1 wherein the second pattern comprises a glyph.

10. The tamper-evident electric paper of claim 1 wherein the second pattern is an encryption.

11. The tamper-evident electric paper of claim 1, wherein the first sheet and the second sheet are permanently bonded together.

12. The tamper-evident electric paper of claim 11, wherein the first sheet and the second sheet are permanently bonded together with a glue.

13. The tamper-evident electric paper of claim 1, wherein the first sheet is bonded to the second sheet with a reversible bonding agent.

14. The tamper-evident electric paper of claim 13, wherein the reversible bonding agent is a glue.

15. Tamper-evident electric paper, comprising:

a first substrate;

a second substrate; and pixel elements located between the first substrate and the second substrate wherein a security pattern is defined by the pixel elements.

16. The tamper-evident electric paper of claim 15, wherein the security pattern is an encryption.

* * * * *